(12) United States Patent
Iliopoulos et al.

(10) Patent No.: US 10,295,970 B2
(45) Date of Patent: May 21, 2019

(54) METHOD FOR ATTACHMENT OF A PRE-ASSEMBLED POWERPLANT AND PYLON ASSEMBLY TO AN AIRCRAFT

(71) Applicant: Bombardier Inc., Dorval (CA)

(72) Inventors: Alexandros Iliopoulos, Montreal (CA); Kevin Shephard, Morin Heights (CA); Roger-Andre Bergeron, Laval (CA); George Bradley, Montreal (CA)

(73) Assignee: C SERIES AIRCRAFT LIMITED PARTNERSHIP, Mirabel (CA)

( * ) Notice: Subject to any disclaimer, the term of this patent is extended or adjusted under 35 U.S.C. 154(b) by 352 days.

(21) Appl. No.: 14/907,345

(22) PCT Filed: Jul. 16, 2014

(86) PCT No.: PCT/IB2014/001336
§ 371 (c)(1),
(2) Date: Jan. 25, 2016

(87) PCT Pub. No.: WO2015/015262
PCT Pub. Date: Feb. 5, 2015

(65) Prior Publication Data
US 2016/0167808 A1  Jun. 16, 2016

Related U.S. Application Data

(60) Provisional application No. 61/859,459, filed on Jul. 29, 2013.

(51) Int. Cl.
*B64F 5/00* (2017.01)
*B64D 27/26* (2006.01)
(Continued)

(52) U.S. Cl.
CPC ............. *G05B 15/02* (2013.01); *B64D 27/26* (2013.01); *B64F 5/10* (2017.01)

(58) Field of Classification Search
CPC .......... B64F 5/0009; B64F 5/10; G05B 15/02; B64D 27/26
See application file for complete search history.

(56) References Cited

U.S. PATENT DOCUMENTS 1,782,013 A * 11/1930 Rohrbach ............. B64D 27/06
244/135 R
3,318,554 A * 5/1967 Mullins .................. B64D 27/04
244/54
(Continued)

FOREIGN PATENT DOCUMENTS

CN 101081641 A 12/2007
CN 101450715 A 6/2009
(Continued)

OTHER PUBLICATIONS

PCT international Search Report and Written Opinion dated Dec. 17, 2014 re: International Application No. PCT/IB2014/001336.
(Continued)

*Primary Examiner* — Ryan J. Walters
*Assistant Examiner* — Lawrence Averick
(74) *Attorney, Agent, or Firm* — Norton Rose Fulbright Canada LLP; Tamara O'Connell

(57) ABSTRACT

A method for installing a pre-assembled powerplant and pylon assembly on an aircraft comprises determining a first length of a first link, determining a second length of a second link, determining a first distance occupyable by the first link between the pylon and the aircraft, determining a second distance occupyable by the second link between the pylon and the aircraft, determining a first result by subtracting the first distance from the first length, determining a second result by subtracting the second distance from the second length, and determining a third result by adding the first result and the second result. If the third result is less than or equal to zero, the first link is installed between the pylon and
(Continued)

the aircraft before the second link. If the third result is greater than zero, the second link is installed between the pylon and the aircraft before the first link.

11 Claims, 10 Drawing Sheets

(51) Int. Cl.
*G05B 15/02* (2006.01)
*B64F 5/10* (2017.01)

(56) References Cited

U.S. PATENT DOCUMENTS

| | | | | |
|---|---|---|---|---|
| 5,746,391 | A * | 5/1998 | Rodgers | B64D 27/18 244/54 |
| 6,095,456 | A * | 8/2000 | Powell | B64D 27/18 244/131 |
| 6,708,925 | B2 * | 3/2004 | Udall | B64D 27/16 244/54 |
| 7,083,143 | B2 * | 8/2006 | Whitmer | B64D 27/18 244/54 |
| 8,104,708 | B2 * | 1/2012 | Chouard | B64D 27/26 244/54 |
| 8,262,050 | B2 * | 9/2012 | Linz | B66C 1/107 244/54 |
| 8,523,516 | B2 * | 9/2013 | Vauchel | B64D 27/18 415/121.2 |
| 9,068,809 | B1 * | 6/2015 | Lagally | G01B 11/14 |
| 9,156,566 | B2 * | 10/2015 | Vauchel | B64D 27/18 |
| 9,302,785 | B2 * | 4/2016 | Buckus | F02C 7/20 |
| 9,435,633 | B2 * | 9/2016 | Lagally | G01B 11/14 |
| 9,738,391 | B2 * | 8/2017 | Mercier | F01D 25/285 |
| 2004/0245383 | A1 * | 12/2004 | Udall | B64D 27/16 244/54 |
| 2009/0139072 | A1 * | 6/2009 | Buckus | F02C 7/20 29/281.4 |
| 2010/0040466 | A1 * | 2/2010 | Vauchel | B64D 27/18 415/213.1 |
| 2010/0181418 | A1 * | 7/2010 | Vauchel | B64D 27/18 244/54 |
| 2011/0127369 | A1 * | 6/2011 | Dussol | B64D 27/18 244/54 |

FOREIGN PATENT DOCUMENTS

| | | |
|---|---|---|
| CN | 101522524 A | 9/2009 |
| CN | 101801787 A | 8/2010 |
| FR | 2917710 | 12/2008 |
| WO | 2007137812 A1 | 12/2007 |

OTHER PUBLICATIONS

English translation of France Patent Publication No. FR2917710 dated Dec. 26, 2008.
Chinese Patent Office; Office Action dated Nov. 28, 2016 re: Chinese Patent Application No. 201480039765.4.
English translation of Chinese patent document No. CN101522524A dated Sep. 2, 2009; www.google.ca/patents . . . .
English translation of Chinese patent document No. CN101450715A dated Jun. 10, 2009; www.google.ca/patents . . . .
English translation of Chinese patent document No. CN101081641A dated Dec. 5, 2007; www.google.ca/patents . . . .
English translation of Chinese patent document No. CN101801787A dated dated Aug. 11, 2010; www.google.ca/patents . . . .

* cited by examiner

METHOD FOR ATTACHMENT OF A PRE-ASSEMBLED POWERPLANT AND PYLON ASSEMBLY TO AN AIRCRAFT

CROSS-REFERENCE TO RELATED APPLICATION(S)

This application is a national phase application under 35 U.S.C. 371 of International Patent Application No. PCT/IB2014/001336 filed on Jul. 16, 2014, which claims priority from U.S. Provisional Patent Application Ser. No. 61/859,459 filed on Jul. 29, 2013, the entire content of which is incorporated herein by reference.

FIELD OF THE INVENTION

The present invention concerns a method for attaching a powerplant to an aircraft. More specifically, the present invention concerns a method for attaching a pre-assembled powerplant and pylon assembly to the wing of an aircraft.

DESCRIPTION OF THE RELATED ART

In the construction of an aircraft, it is conventional to attach a pylon to the wing of an aircraft before attaching the engine (also referred to as a "powerplant" herein) to the pylon. The engine is then attached to the pylon, without any of the cowlings (nacelle or other components) that surround (or are attached to) the engine. The cowlings are the protective covers that surround the engine, such as a jet engine or turbine engine.

The pylon is a structural member that connects between the engine and the wing. The pylon comprises several connection points to the wing, three of which are typical for any engine installation. The three connection points are: a (1) primary pylon attachment, (2) a forward link attachment, and (3) a rear link attachment. The forward link attachment is ahead of the primary pylon attachment point and the rear link attachment is rearward of the primary pylon attachment. A forward link connects between the forward link attachment and the pylon. A rear link connects between the rear link attachment and the pylon.

As should be apparent to those skilled in the art, jet engines (or turbine engines) are very heavy. Therefore, positioning the engine with respect to the pylon that has been pre-attached to the wing presents a challenge. If the attachment points do not align correctly, installation of the engine may be hampered or significantly slowed down.

In the prior art, it is common for the engine to be manipulated manually until attachment points between the pylon and the engine are properly aligned so that the engine may be secured to the pylon, which has been pre-attached to the wing of the aircraft. The cowlings (nacelles) are then assembled to the pylons/engines.

As may be apparent to those skilled in the art, it is not recommended to manipulate the engine too significantly during attachment of the engine to the pylon. Engines are heavy and difficult to handle.

In the prior art, the assembly time required to connect the engine to the pylon may be quite lengthy due to the time required to align the engine with the pylon prior to attachment of the engine to the pylon.

In addition, it is common for fit errors to exist or be created between the engine and the pylon during installation of the engine on the pylon and more significantly from the cowlings (nacelle) to the pylon/engine. Specifically, the tooling that is used to simulate the pylon, prior to connection of the engine and cowlings (nacelle) to the pylon, introduces tolerance variation errors that further exacerbate the issues associated with attaching the engine and cowlings (nacelle) to the pylon. These errors are made worse depending upon the rigidity and positional attitude of the engine with respect to the pylon.

The tool from which the engine is suspended also may introduce tolerance and fit errors. As might be apparent to those skilled in the art, the orientation of the engine when suspended from the tool may not align precisely with the pylon during installation. These problems also are applicable during cowling (nacelle) manufacture.

In addition, as might be apparent to those skilled in the art, tolerance and fit errors are prone to increase over time. Specifically, the tool that carries the engine prior to attachment of the engine to the pylon requires maintenance and adjustment to ensure a proper alignment and fit between the engine and the pylon. Also, this is apparent during cowling (nacelle) tooling.

Finally, the construction of each aircraft and each engine naturally results in small variations from one aircraft (or engine) to the next. This may impact the final assembly of the aircraft in ways that are difficult to anticipate and, possibly, awkward to address during final assembly of the aircraft.

As aircrafts have increased in size, so too have the engines that power these larger aircraft. As engines have increased in size, they have also become heavier.

As a result of the confluence of factors, such as increased weight of modern engines, larger sizes for modern engines, and stricter requirements for the forces that may be applied to engines during installation, a need has developed to improve the connection of engines and cowlings (nacelles), and their pylons, to the wings of aircraft.

It is in the context of this confluence of factors that the present invention was developed.

SUMMARY OF THE INVENTION

The present invention addresses one or more of the deficiencies noted with respect to the prior art.

It is, therefore, one aspect of the present invention to provide a method for installing a pre-assembled powerplant and pylon assembly, which may optionally comprise a cowling (nacelle) pre-assembled therewith, on an aircraft. When the pre-assembled powerplant and pylon assembly is further pre-assembled with a cowling(nacelle) it may be referred to as a PQuad (Podded PowerPlant and Pylon). The method comprises determining a first length of a first link with a first end and a second end, the first link being positionable between the pylon and the aircraft and determining a second length of a second link with a third end and a fourth end, the second link being positionable between the pylon and the aircraft. The method also comprises determining a first distance between a first position on the pylon and a second position on the aircraft, wherein the first position and the first end are in register when the first link connects the pylon to the aircraft and the second position and the second end are in register when the first link connects the pylon to the aircraft, and determining a second distance between a third position on the pylon and a fourth position on the aircraft, wherein the third position and the third end are in register when the second link connects the pylon to the aircraft and the fourth position and the fourth end are in register when the second link connects the pylon to the aircraft. In addition, the method comprises determining a first result by subtracting the first distance from the first length, determining a second result by subtracting the second distance from the second length, determining a third result by adding the first result and the second result, evaluating if the third result is less than or equal to zero, and evaluating if the third result is greater than zero. If the third result is less than or equal to zero, installing the first link between the pylon and the aircraft before installing the second link. If the third result is greater than zero, installing the second link between the pylon and the aircraft before installing the first link.

The method may comprise connecting the pylon to the aircraft at a primary attachment before installing either the first link or the second link.

In one embodiment, the method comprises connecting the first end of the first link to the first position on the pylon before connecting the second end of the first link to the second position on the aircraft, and connecting the third end of the second link to the third position on the pylon before connecting the fourth end of the second link to the fourth position on the aircraft.

In one contemplated embodiment, the method includes connecting the second end of the first link to the second position on the aircraft before connecting the first end of the first link to the first position on the pylon and connecting the fourth end of the second link to the fourth position on the aircraft before connecting the third end of the second link to the third position on the pylon.

In another contemplated embodiment, the method comprises connecting the first end of the first link to the first position on the pylon before connecting the second end of the first link to the second position on the aircraft and connecting the fourth end of the second link to the fourth position on the aircraft before connecting the third end of the second link to the third position on the pylon.

In a further alternative, it is contemplated that the method comprises connecting the second end of the first link to the second position on the aircraft before connecting the first end of the first link to the first position on the pylon and connecting the third end of the second link to the third position on the pylon before connecting the fourth end of the second link to the fourth position on the aircraft.

The present invention also is intended to encompass a method where the first and third positions define first and second attachment points, the primary attachment point, the first attachment point, and the second attachment point are positioned longitudinally with respect to the aircraft, and the primary attachment point is interposed between the first attachment point and the second attachment point.

Moreover, the method is contemplated to encompass embodiments where the primary attachment point comprises third and fourth attachment points, and the third and fourth attachment points are aligned laterally with respect to the aircraft.

Still further, the method is contemplated to encompass instances where the first and third positions define first and second attachment points, the primary attachment point comprises third and fourth attachment points, the first and the second attachment points are aligned longitudinally with respect to the aircraft, the third and fourth attachment points are aligned laterally with respect to the aircraft, and the primary attachment point is interposed between the first attachment point and the second attachment point.

In the method of the present invention, the powerplant and pylon assembly may comprise at least one selected of a left fan cowl a left thrust reverser, a right fan cowl, a right thrust reverser, or an inlet cowl. As indicated above, the PQuad is contemplated to include the powerplant, the pylon, and at least the left fan cowl, the right fan cowl, and/or the inlet cowl, depending on the construction.

In another contemplated embodiment, the present invention provides a method for installing a pre-assembled powerplant and pylon assembly on an aircraft. The method comprises determining a first distance between a first attachment point on the powerplant and pylon assembly and a second attachment point on the aircraft, a first link having a first length being adapted for attachment between the first attachment point and the second attachment point, determining a second distance between a third attachment point on the powerplant and pylon assembly and a fourth attachment point on the aircraft, a second link having a second length being adapted for attachment between the third attachment point and the fourth attachment point, and determining which of the first link and the second link to attach between the powerplant and pylon assembly and the aircraft first, at least based on one of the first length, the second length, the first distance, or the second distance.

With respect to this embodiment, it is contemplated that the method may include a) determining a difference between the first length and the first distance, b) determining a difference between the second length and the second distance, and c) determining a result by summing the differences of a) and b). In this embodiment, if the result is less than or equal to zero, the first link is attached between the powerplant and pylon assembly and the aircraft first and, if the result is greater than zero, the second link is attached between the powerplant and pylon assembly and the aircraft first.

In connection with at least one contemplated embodiment of the present invention, it is contemplated that the first distance and the second distance are determined based at least partly on coordinates of the first attachment point and third attachment point with respect to a first coordinate system. Coordinates of the second attachment point and the fourth attachment point are determined with respect to a second coordinate system.

The present invention also encompasses a system for determining an order for attaching links between a powerplant and pylon assembly and an aircraft. The system includes: a) a data processor including a CPU and a non-transient machine readable storage medium encoded with software for execution by the CPU, for i) processing data conveying information about a first length of a first link, a second length of a second link, a first distance between a first attachment point on the powerplant and pylon assembly and a second attachment point on the aircraft, the first link being adapted for being attached between the first attachment point and the second attachment point, a second distance between a third attachment point on the powerplant and pylon assembly and a fourth attachment point on the aircraft, the second link being adapted for being attached between the third attachment point and the fourth attachment point, ii) computing, via the software, a determination of which of the first link and the second link should be installed first between the powerplant and pylon assembly and the aircraft, at least in part on a basis of the first length, the second length, the first distance and the second distance, and b) an output including output data identifying which of the first link and the second link should be installed first.

Further aspects of the present invention will be made apparent from the paragraphs that follow.

BRIEF DESCRIPTION OF THE DRAWING(S)

The present invention will now be described in connection with the drawing appended hereto, in which.

DETAILED DESCRIPTION OF EMBODIMENT(S) OF THE INVENTION

The present invention will now be described in connection with one or more embodiments thereof. The discussion of the embodiments is not intended to be limiting of the present invention. To the contrary, any discussion of embodiments is intended to exemplify the breadth and scope of the present invention. As should be apparent to those skilled in the art, variations and equivalents of the embodiment(s) described herein may be employed without departing from the scope of the present invention. Those variations and equivalents are intended to be encompassed by the scope of the present patent application.

The present invention will now be discussed in the context of the construction of a jet aircraft where one or more jet engines (also referred to as turbine engines or turbofan engines) are affixed (or attached) to each wing of the aircraft. While the invention is discussed in this context, the present invention is not intended to be limited solely to the construction of aircraft with wing-born jet engines. It is contemplated that the present invention may be employed in connection with the assembly of other engine types (i.e., turboprop engines) to aircraft. In addition, while the present invention focuses of the attachment of jet engines to the wings of an aircraft, it is contemplated that the present invention may be employed to connect an engine to other parts of an aircraft. For example, it is contemplated that the present invention may be employed to connect an engine to a tail section (or empennage) of an aircraft, depending upon the construction specifics for that aircraft.

With respect to the discussion that follows, it is noted that specific directional conventions are assumed to be known to those skilled in the art. The directional conventions are consistent with the forward travel direction of the aircraft. In this context, the term "forward" (or its equivalent) refers to the front end (or nose end) of the aircraft. The term "rear" (or its equivalent) refers to the aft end (or tail end) of the aircraft. The term "right side" (or its equivalent) refers to the right side (or starboard side) of the aircraft as defined by the forward and aft ends of the aircraft. The term "left side" (or its equivalent) refers to the left side (or port side) of the aircraft, also as defined by the fore and aft ends thereof.

Additionally, the term "longitudinal" refers to the longitudinal direction of the aircraft that extends from the front end to the rear end of the aircraft. The term "lateral" refers to the lateral direction of the aircraft that extends from the right side to the left side of the aircraft (i.e., as defined by the aircraft's wingspan). As should be apparent, the lateral direction is orthogonal to the longitudinal direction. The terms "up" (or top) and "down" (or bottom) refer to a vertical direction or orientation of the aircraft when the aircraft is parked on the ground.

Figure 1:
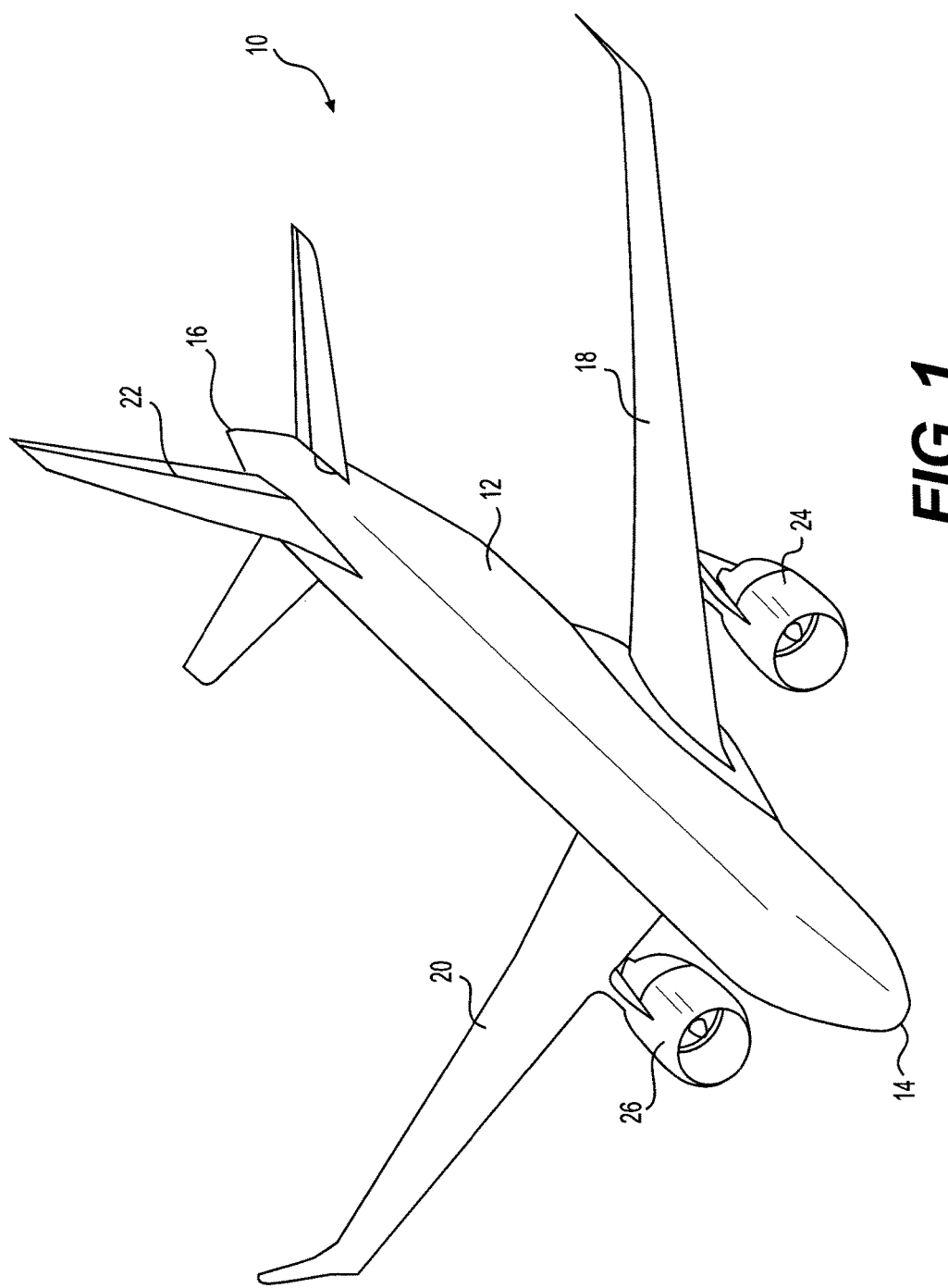
FIG. 1 is a perspective illustration of a typical aircraft on which the method of the present invention may be employed.

FIG. 1 is a perspective illustration of an aircraft 10 to which the present invention applies. The aircraft 10 comprises a fuselage 12 longitudinally defining a forward end 14 and a rear (or aft) end 16. Two wings 18, 20 extend laterally from the fuselage 12. A tail section 22 (or empennage) is attached to the rear end 16 of the aircraft. As should be apparent to those skilled in the art, the wings 18, 20 and the tail section 22 incorporate multiple control surfaces that are responsible for the flying characteristics and operation of the aircraft 10. Two powerplants 24, 26 (also referred to as "engines" 24, 26 herein) are suspended from and connect to the wings 18, 20, as illustrated, via pylons 46 (which are discussed in greater detail below).

Figure 2:
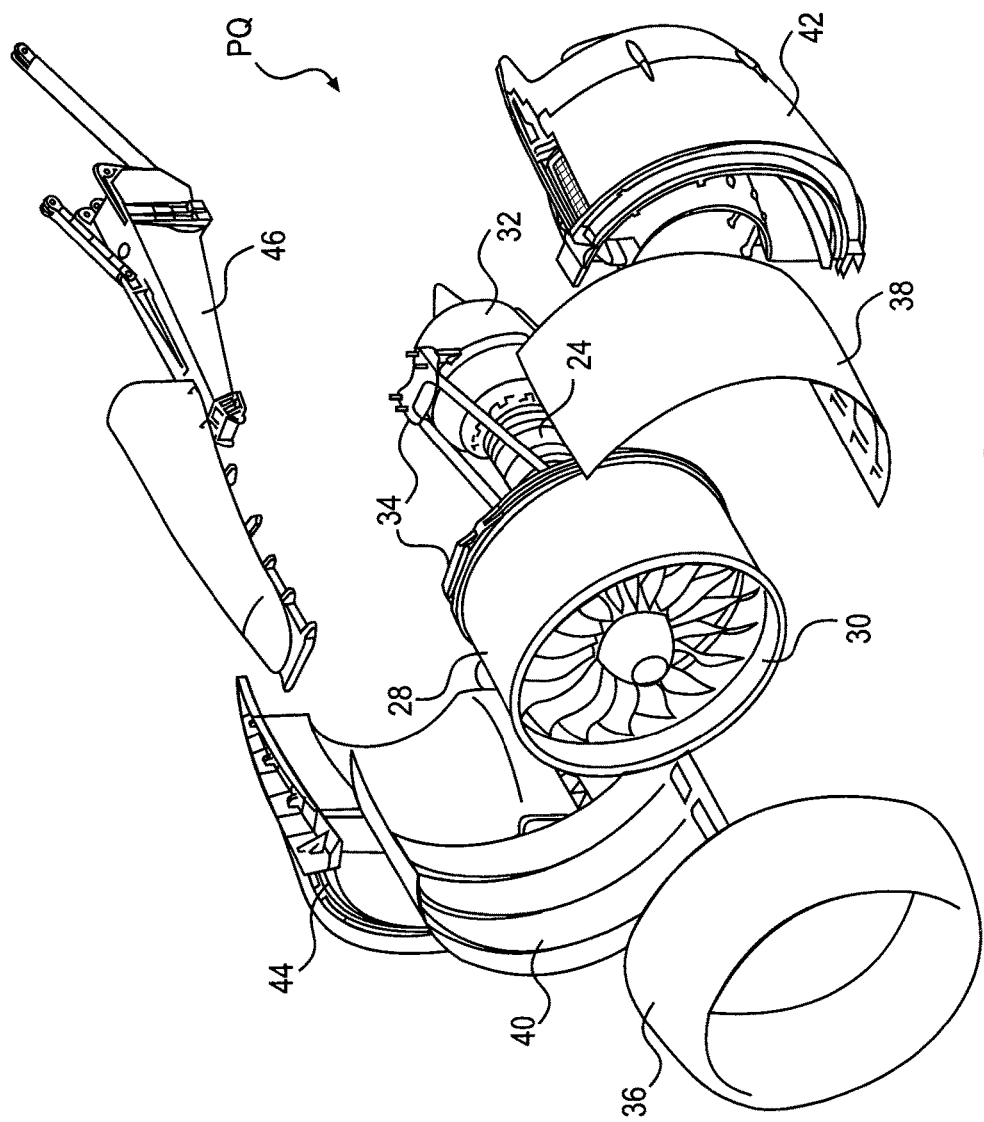
FIG. 2 is an exploded, perspective illustration of an example of a powerplant and pylon assembly for attachment to a wing of the aircraft illustrated in FIG. 1.

Using the powerplant 24 as a reference, it is noted that the powerplant 24 comprises a number of parts, which are illustrated in FIG. 2. As should be apparent, the parts of the powerplant 24 that are discussed herein are meant to be exemplary of a typical powerplant construction consistent with the present invention. The identification of any specific parts is not intended to be limiting of the present invention.

For the present discussion, it is contemplated that the powerplants 24, 26 share the same construction. It is contemplated, however, that the powerplants 24, 26 may not share the same construction. While it is not common for an aircraft 10 to include different powerplants 24, 26 on the wings 18, 20, it is noted that the present invention is not limited to the construction of an aircraft 10 where the powerplants 24, 26 are identical in their construction.

FIG. 2 is an exploded, perspective view of the powerplant 24 illustrated in FIG. 1, with additional components, such as the pylon 46 shown in proximity. The powerplant 24 itself comprises thrust-generating components, referred to herein as a thrust generator 28. The thrust generator 28 comprises the turbofan 30 and related mechanical components. In the illustrated example, the thrust generator 28 comprises a primary nozzle 32 at its rear end through which the combustion products from the powerplant 24 are discharged. The thrust generator 28 also comprises several engine mounts 34, details of which are provided below.

At the front end of the powerplant 24, an inlet cowl 36 precedes the turbofan 30. The inlet cowl 36 defines an air inlet into the powerplant 24. A left fan cowl 38 surrounds the left side of the powerplant 24 at a position adjacent to the turbofan 30. Similarly, a right fan cowl 40 surrounds the right side of the powerplant 24 at a position adjacent to the turbofan 30. A left thrust reverser 42 is positioned rearward of the left fan cowl 38. A right thrust reverser 44 is positioned rearward of the right fan cowl 40.

Prior to the powerplant 24 being attached to the wing, the powerplant 24 and the pylon 46 may be pre-assembled, resulting in a pre-assembled powerplant 24 and pylon 46 assembly (hereafter the powerplant 24 and pylon 46 assembly). For purposes of the present invention, the pylon 46 is attached to the thrust generator 28 of the powerplant 24, via the mounts 34. In a further embodiment, the pre-assembled powerplant 24 and pylon 46 assembly further comprises, at least one cowl 36, 38, 40, and (optionally) thrust converters 42, 44, pre-assembled therewith, resulting in what is referred to as a PQuad PQ, as identified above. An equivalent structure (or structures) may be employed in place of the pylon 46 without departing from the scope of the present invention. Moreover, while a pylon 46 (or equivalent structure) is typically employed when connecting the powerplant 24 to the aircraft 10, a pylon 46 is not required to practice the present invention.

Figure 3:
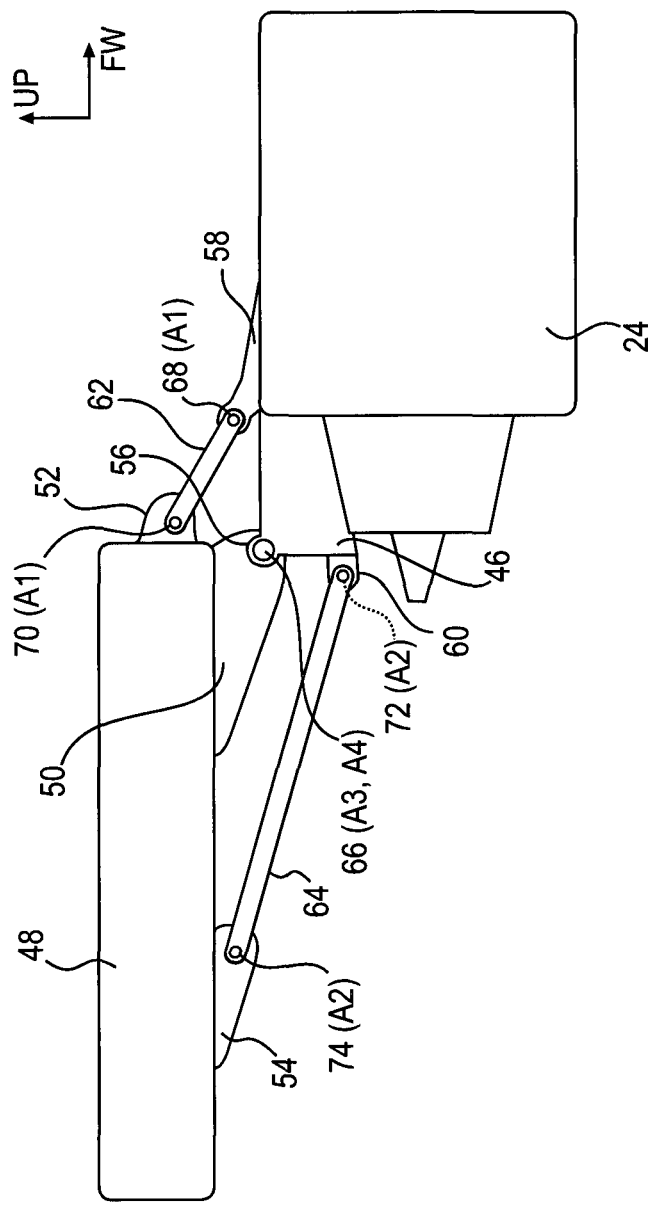
FIG. 3 is a graphical side view of the powerplant and pylon assembly illustrated in FIG. 2 after having been attached to the wing of aircraft illustrated in FIG. 1.

FIG. 3 is a graphical side view of the powerplant 24 and pylon 46 assembly, after being attached to the wing 18 of the aircraft. The illustration provides a general overview of the attachment points where the powerplant 24 and pylon 46 assembly attach to a wing torque box 48. In this illustration, three attachment points are shown. The attachment points include, but are not limited to: (1) a primary attachment bracket 50 (or brackets 50), (2) a forward link attachment bracket 52 (or brackets 52), and (3) a rear link attachment bracket 54 (or brackets 54). In the discussion that follows, the forward link attachment bracket 52 is referred to as the first link attachment bracket 52. In addition, the rear link attachment bracket 54 is referred to as the second link attachment bracket 54.

On the pylon 46, the attachment brackets provided thereon correspond to the attachment brackets 50, 52, 54 on the wing torque box 48: (1) the primary pylon attachment bracket 56 (or brackets 56), (2) the first pylon attachment bracket 58 (also referred to as the forward pylon attachment bracket 58 or brackets 58), and (3) the second pylon attachment bracket 60 (also referred to as the rear pylon attachment bracket 60 or brackets 60).

It is contemplated that the wing torque box attachment brackets 50, 52, 54 are affixed to the wing torque box 48 via a weld or other suitable attachment means (including fasteners). Similarly, the pylon attachment brackets 56, 58, 60 are contemplated to be connected to the pylon 46 via a weld or other suitable attachment means (including fasteners).

A forward link 62 (also referred to as a first link 62) extends between the first attachment bracket 52 and the first pylon attachment bracket 58. Similarly, a second link 64 extends from the second attachment bracket 54 to the second pylon attachment bracket 60.

With continued reference to FIG. 3, in a non-limiting embodiment shown, there are six pins that connect the powerplant 24 and pylon 46 assembly to the wing torque box 48. Two pins 66 connect the primary attachment bracket 50 to the primary pylon attachment bracket 56 (as shown in better detail in FIG. 4). A first forward pin 68 connects the first pylon attachment bracket 58 to the front end of the forward link 62. A second forward pin 70 connects the forward link attachment bracket 52 to the rear end of the forward link 62. A first rear pin 72 connects the second pylon attachment bracket 60 to the front end of the rear link 64. A second rear pin 74 connects the rear link attachment bracket 54 to the rear end of the rear link 64. Each of the pins 66, 68, 70, 72, 74 is contemplated to establish a pivotal attachment point/axis between the parts connected thereby.

Figure 4:
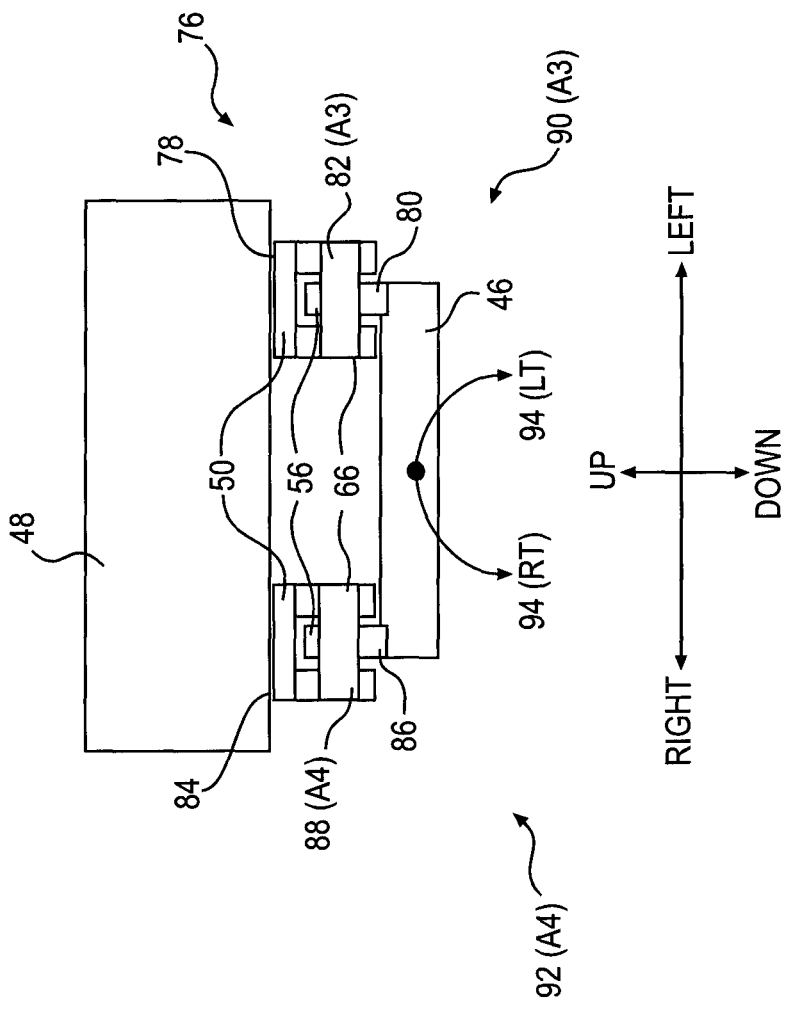
FIG. 4 is a graphical front view of a portion of the powerplant and pylon assembly illustrated in FIG. 1, highlighting one embodiment of the primary attachment between the pylon and the wing of the aircraft.

FIG. 4 is a graphical, front view of the primary attachment 76 between the pylon 46 and the wing torque box 48. The front view is presented from the perspective of a person standing in front of the primary attachment 76 looking to the rear end 16 of the aircraft 10. In this illustration, the primary attachment bracket 50 and the primary pylon attachment bracket 56 are shown in relation to one another after the powerplant 24 and pylon 46 assembly is connected to the wing torque box 48.

As should be apparent from FIG. 4, the primary attachment bracket 50 comprises a left primary attachment bracket 78 and a right primary attachment bracket 84. Likewise the primary pylon attachment bracket 56 comprises a left primary pylon attachment bracket 80 and a right primary pylon attachment bracket 86. As shown, the left primary attachment bracket 78 is coupled to the left primary pylon attachment bracket 80 via a left primary pin 82 (also numbered pin 66). The right primary attachment bracket 84 is coupled to the right primary pylon attachment bracket 86 via a right primary pin 88 (also numbered pin 66). For ease of reference, the connection of the left primary attachment bracket 78 to the left primary pylon attachment bracket 80 is referred to as the left attachment 90. Following this convention, the connection of the right primary attachment bracket 84 and the right primary pylon attachment bracket 86 is referred to as the right attachment 92. In an alternative embodiment, a single pin 66 or shaft could extend between the left attachment 90 and right attachment 92.

With renewed reference to FIG. 3, the first link 62 and the second link 64 are individual rods that connect the powerplant 24 and pylon 46 assembly to the wing torque box 48. As a result, taking into account the construction of the primary attachment 76, there are four illustrated attachment points between the powerplant 24 and pylon 46 assembly and the wing torque box 48: (1) the first link 62, (2) the second link 64, (3) the left attachment 90, and (4) the right attachment 92. This construction is referred to as a hyperstatic arrangement. One aspect of the present invention, as detailed below, is to provide an attachment of a pre-assembled powerplant 24 and pylon 46 assembly to a wing torque box 48 in a hyperstatic configuration.

A hyperstatic construction is one that comprises four or more force-directing (or load bearing) members. In this case, the four force-directing members or connections encompass the first link 62, the second link 64, the left attachment 90, and the right attachment 92, as noted above.

A hyperstatic connection is one where the static equilibrium equations are insufficient for determining internal forces and reactions on the associated structure. As should be apparent to those skilled in the art, an example of a hyperstatic equilibrium is a four-legged stool resting on a surface. Because a four-legged stool comprises four legs, when a force is applied to the stool (i.e., a force offset from a centerline that would cause the stool to tip over), it is not possible to calculate the forces applicable to each of the four legs to establish a static equilibrium. This example is contrasted with a three-legged stool, which is statically determinate. In other words, static equilibrium equations are sufficient to determine internal forces and reactions on a three-legged stool.

It is noted that a hyperstatic configuration is not limited to constructions having only four connection (or force-directing) points. A hyperstatic configuration may be established with a larger number of connection (or force-directing points). As will be made apparent from the discussion that follows, the present invention is intended to encompass any such hyperstatic configurations, whether they include four connections or more.

It also is noted that the present invention is not limited to the four connections detailed above. In fact, it is contemplated that the powerplant 24 and pylon 46 assembly could connect to the wing torque box 48 via other connections (not shown). Specifically, it is contemplated that the powerplant 24 and pylon 46 assembly will connect to the wing torque box 48 via one or more links providing lateral stability to the powerplant 24 and pylon 46 assembly. As a result, the present invention should not be considered to be limited solely to the embodiment(s) discussed herein.

Since any discussion of a hyperstatic arrangement requires four or more attachment points, and since the links 62, 64 define elongated attachment points, for purposes of defining the hyperstatic connection between the powerplant 24 and pylon 46 assembly and the wing torque box 48, the four attachment points are defined by the first forward pin 68, the first rear pin 72, the left primary pin 82, and the right primary pin 88. These pins 68, 72, 82, 88 define the four attachment points relevant to the present invention.

The first forward pin 68, which connects the first link 62 to the first pylon attachment bracket 58 is referred to herein as the first attachment point A1. The first rear pin 72, which connects the second link 64 to the second pylon attachment bracket 60 is referred to as the second attachment point A2. The left primary pin 82, which connects the left primary attachment bracket 78 to the left primary pylon attachment bracket 80, is referred to as the third attachment point A3. The right primary pin 88, which connects the right primary attachment bracket 84 to the right primary pylon attachment bracket 86, is referred to as the fourth attachment point A4.

As should be apparent from the foregoing, the attachment points A1, A2, A3, A4 exist with reference to the pylon 46. While it is contemplated that the pylon 46 of the powerplant 24 and pylon 46 assembly is attached to the wing box 48, as noted above, this arrangement is not required to practice the present invention. It is contemplated that the pylon 46 may be replaced with one or more other components suitable for connecting the powerplant 24 to the wing torque box 48, without departing from the scope of the present invention. Moreover, it is contemplated that the pylon 46 (and/or any variations or equivalents) may be excluded altogether without departing from the scope of the present invention.

In addition, it is noted that the first link 62 and the second link 64 may be considered as a part of the powerplant 24 and pylon 46 assembly. If so, the locations of the first and second attachment points A1 and A2 change. In this contemplated configuration, the second forward pin 70, which connects the forward link attachment bracket 52 to the first link 62, acts as the first attachment point A1. Similarly, the second rear pin 74, which connects the rear link attachment bracket 54 to the second link 64, acts as the second attachment point A2. The pins 82, 88 continue to define the attachment points A3 and A4, as discussed above.

Figure 5:
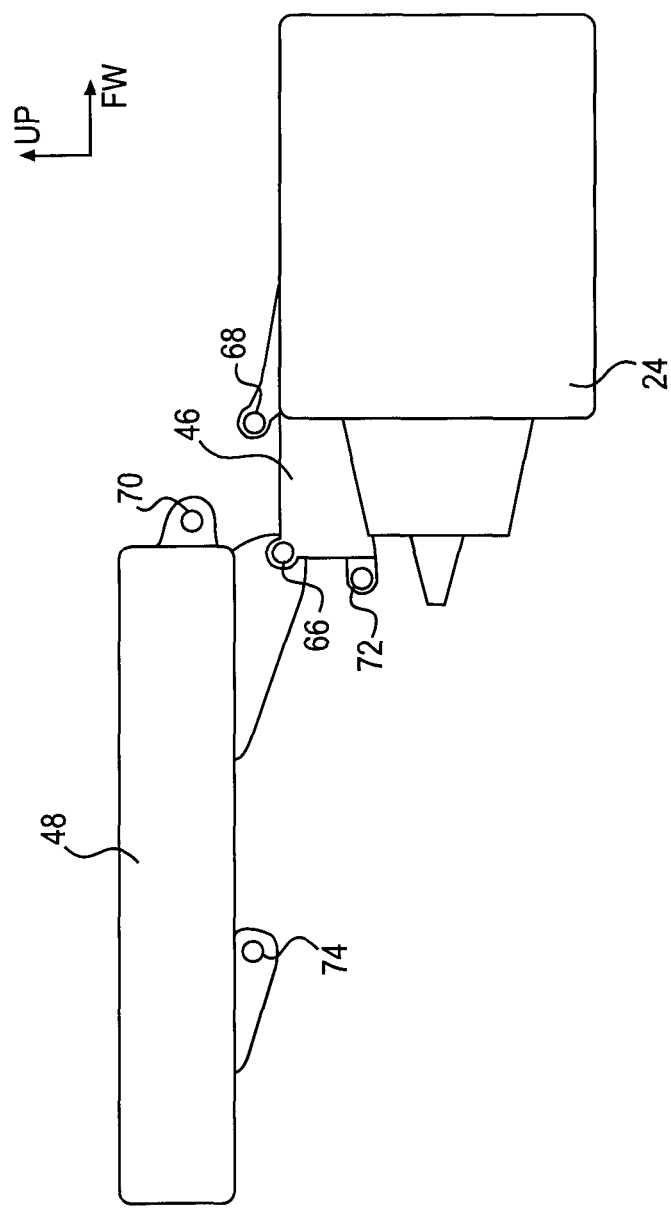
FIG. 5 is a graphical side view of the powerplant and pylon assembly illustrated in FIG. 2, after the primary attachment has been made between the pylon and the wing of the aircraft illustrated in FIG. 1.

FIG. 5 is a graphical, side view of the powerplant 24 and pylon 46 assembly, and wing torque box 48 at the moment when the primary attachment 76 has been made between the powerplant 24 and pylon 46 assembly and the wing torque box 48. This illustration is intended to illustrate a first step in the attachment of the powerplant 24 and pylon 46 assembly to the wing torque box 48.

In FIG. 5, the pins 82, 88 have been inserted. As a result, the powerplant 24 and pylon 46 assembly is attached to the wing 18 such that the pylon 46 may pivot about the primary attachment 76. In this view, the remaining attachment points are not yet connected to the wing torque box 48.

As should be apparent from FIG. 4, to attach the powerplant 24 and pylon 46 assembly to the wing torque box 48, it is contemplated that the powerplant 24 and pylon 46 assembly may need to be rotated (or tilted), in the directions of the arrows 94(RT) and 94(LT). The left tilt arrow 94(LT) refers to a left tilt or "LT" of the powerplant 24 and pylon 46 assembly. The right tilt arrow 94(RT) refers to a right tilt or "RT" of the powerplant 24 and pylon 46 assembly. The left tilt LT and the right tilt RT directions indicate how the powerplant 24 and pylon 46 assembly may be tilted so that the brackets 78, 80 and 84, 86 are in register, thereby permitting the pins 82, 88 to be inserted thereinto. There are a number of ways that this may be accomplished, as should be apparent to those skilled in the art. Accordingly, further discussion of the methodology associated with this alignment is not expounded upon further herein.

Figure 6:
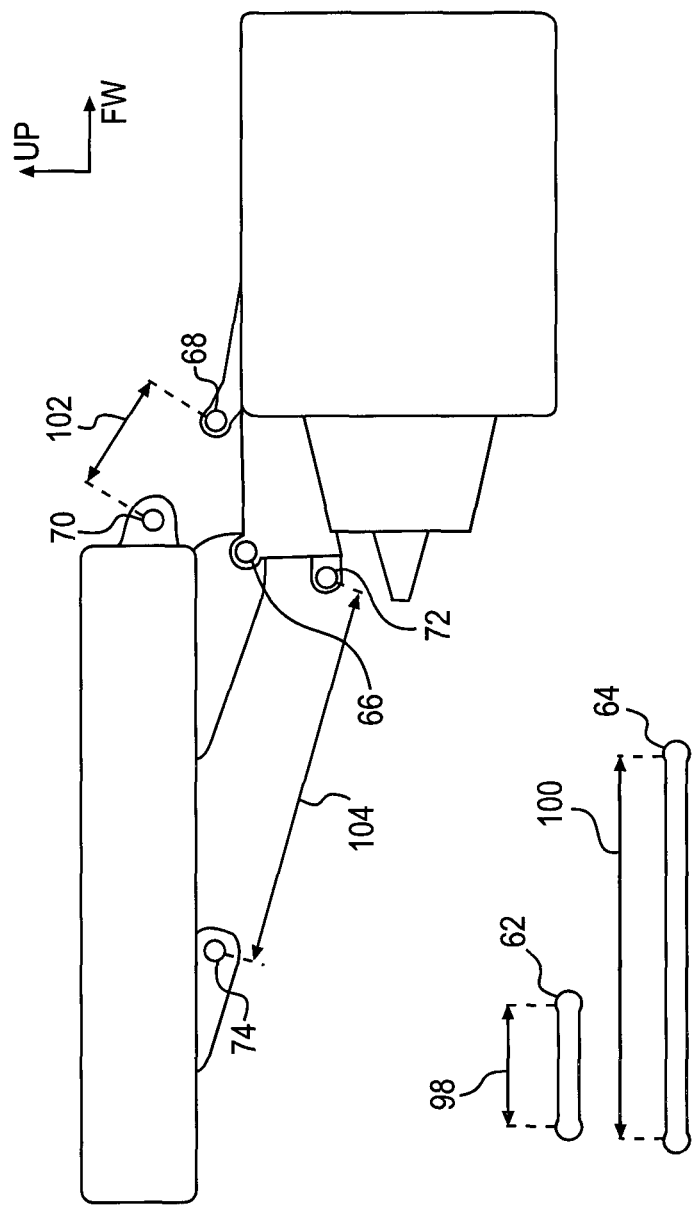
FIG. 6 is a graphical side view of the powerplant and pylon assembly illustrated in FIG. 2, also showing first and second links that are to be attached between the pylon and the wing of the aircraft illustrated in FIG. 1.

FIG. 6 is a graphical, side view of the powerplant 24 and pylon 46 assembly and the wing torque box 48 illustrated in FIG. 5. This illustration is provided to illustrate a second step in the method for attachment of the powerplant 24 and pylon 46 assembly to the wing torque box 48.

In FIG. 6, the first link 62 and the second link 64 are shown in the lower left-hand corner of the drawing. Neither link 62, 64 has been connected between the pylon 46 (attached to the powerplant 24) and the wing torque box 48. The first link 62 has a first link length 98. The second link 64 has a second link length 100.

FIG. 6 also illustrates two distances that are relevant to the method of the present invention. Specifically, a first distance 102 is illustrated as a distance between the first wing box attachment point 70 and the first pylon attachment point 68. The second distance 104 is the distance between the second wing torque box attachment point 74 and the second pylon attachment point 72. As should be apparent, the first distance 102 is less than the second distance 104 in this configuration. While this arrangement is specific to the embodiment described herein, it is noted that the second distance 104 could be less than the first distance 102 without departing from the scope of the present invention.

In the method of the present invention, the length 98 of the first link 62 and the length 100 of the second link 64 are measured, calculated or otherwise obtained. As noted, the length 98 of the first link 62 is referred to as the first link length 98. In addition, the length of the second link 64 is referred to as the second link length 100.

In the method of the present invention, the first distance 102 and the second distance 104 also are measured, calculated or otherwise obtained. As noted, the first distance 102 is the distance between the first forward pin 68 and the second forward pin 70. In addition, the second distance 104 is the distance between the first rear pin 72 and the second rear pin 74. While the powerplant 24 and pylon 46 assembly is capable of rotation about the primary pins 66, the powerplant 24 and pylon 46 assembly will have an initial position after installation of the primary pins 66, which encompass the left primary pin 82 and the right primary pin 88. It is with respect to this initial position that the distances 102, 104 are measured, calculated or otherwise obtained. In this configuration, the powerplant 24 and pylon 46 assembly is secured to and supported by a suitable handling apparatus (not shown).

After the lengths 98, 100 and the distances 102, 104 are measured, calculated or otherwise obtained, the first length 98 is analyzed with respect to the first distance 102 and the second length 100 is analyzed with respect to the second distance 104. On a basis of the first link length 98, the first distance 102, the second link length 100, and the second distance 104, it becomes possible to establish an order of connection of the first link 62 and the second link 64 between the powerplant 24 and pylon 46 assembly and the wing torque box 48.

A limiting factor in the establishment of the order for the attachment of the links 62, 64 is the combined weight of the powerplant 24 and pylon 46 assembly (or, alternatively, the PQuad PQ). More specifically, the force of gravity on the powerplant 24 and pylon 46 assembly pulls the front end of the powerplant 24 and pylon 46 assembly downwardly, thereby causing the powerplant 24 and pylon 46 assembly to pivot around the primary attachment point 76.

It is noted that other components of the powerplant 24 and pylon 46 assembly, such as the cowls 38, 40 and thrust converters 42, 44, as discussed in connection with FIG. 2, may also contribute to the total weight of the powerplant 24 and pylon 46 assembly. Specifically, it is contemplated that, for the method of the present invention, the powerplant 24 and pylon 46 assembly has been pre-assembled to include the left fan cowl 38, the left thrust reverser 42, the right fan cowl 40, the right thrust reverser 44, the inlet cowl 36, as well as other components including, but not limited to any additional support and/or tooling assemblies not described herein. This is the PQuad PQ. In other words, using the method of the present invention, it is contemplated that the PQuad PQ may be attached to the wing torque box 48 in a fully assembled (or at least substantially assembled) condition. This is a departure from prior art installation methodologies.

With reference to the prior art, it is noted that, in a typical, conventional installation, the pylon 46 is first connected to the wing torque box 48. The thrust generator 28 is then connected to the pylon 46. After the thrust generator 28 is connected to the pylon 46, the left fan cowl 38, the left thrust reverser 42, the right fan cowl 40, the right thrust reverser 44, and the inlet cowl 36 are attached to the thrust generator 28 or pylon 46. In other instances, the inlet cowl 36 is pre-assembled onto the thrust generator 28. In other words, in the prior art, it is common for the various components to be assembled after the thrust generator 28 is connected to the pylon 46, after the pylon 46 has been attached to the wing torque box 48. The present invention avoids this additional manufacturing complication by providing a method (among other advantages) permitting at least the powerplant 24 and pylon 46 to be pre-assembled and attached to the aircraft 10 in a fully assembled (or at least substantially assembled) condition.

As noted above, aircraft manufacturers prefer to avoid manipulating a component that weighs several thousand pounds, such as the powerplant 24 and pylon 46 assembly, or PQuad PQ, to avoid damaging the powerplant 24 or otherwise increasing the time required to complete the assembly of the aircraft 10. As should be apparent, if the manufacturer of the aircraft 10 needs to manipulate the position of the powerplant 24 (or PQuad PQ) during installation for any reason, the operation may require complex and expensive machines for implementation. Moreover, the manipulation may be time consuming. These variables increase the cost associated with the assembly of an aircraft 10.

As made apparent from the discussion provided herein, there is a preference for the powerplant 24, the powerplant 24 and pylon 46 assembly, or the PQuad PQ to settle into place after being installed on the aircraft 10. By installing the powerplant 24, the powerplant 24 and pylon 46 assembly, or the PQuad PQ with an initially upwardly inclined slope, gravity may be employed to assist with the installation of the powerplant 24, the powerplant 24 and pylon 46 assembly, or the PQuad PQ. Specifically, with such a starting orientation (i.e., an upward incline), the powerplant 24, the powerplant 24 and pylon 46 assembly, or the PQuad PQ moves downwards under the force of its own weight into a position that is acceptable after certain attachments have been made, and prior to the powerplant 24, the powerplant 24 and pylon 46 assembly, or the PQuad PQ being released from the handling tools and associated handling equipment.

Figure 7:
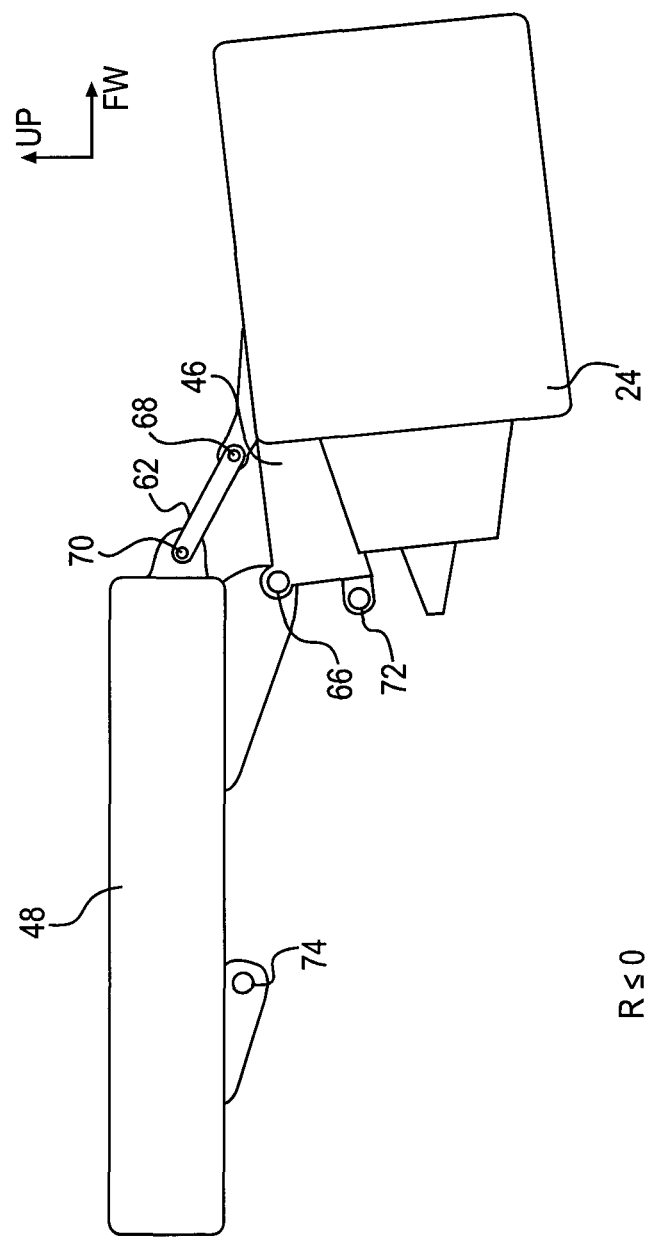
FIG. 7 is a graphical side view of the powerplant and pylon assembly illustrated in FIG. 2, after attachment of a first link but prior to the attachment of a second link between the pylon and the wing of the aircraft illustrated in FIG. 1.

In this context, reference is now made to FIG. 7, which is a graphical side view of the powerplant 24 and pylon 46 assembly and wing torque box 48 shown in FIG. 5. In this drawing, the comparison already has been made between the first distance 102 (either measured or calculated), the first link length 98 (either measured or calculated), the second distance 104 (either measured or calculated), and the second link length 100 (either measured or calculated). Having made these measurements, it was determined that the first link 62 should be connected before the second link 64 is connected. As a result, the first link 62 is shown connecting the pylon 46 to the torque wing box 48.

With respect to the order of attachment of the first link 62 and the second link 64, the method of the present invention compares (or otherwise processes) the first distance 102, the first link length 98, the second distance 104, and the second link length 100. Specifically, the method of the present invention relies at least in part on the following formula to determine if the first link 62 is attached before the second link 64, or vice versa:

$$(L_1-LA_1)+(L_2-LA_2)=R_1+R_2=R \quad (1)$$

The variables in equation (1) are defined as follows. L1 is the length 98 (which is measured, calculated or otherwise obtained) of the first link 62. LA1 is the distance 102 (which is measured, calculated or otherwise obtained) between the first forward pin 68 and the second forward pin 70 (i.e., the attachment distance between the pins 68, 70). L2 is the length 100 (which is measured, calculated or otherwise obtained) of the second link 64. LA2 is the distance 104 (which is measured, calculated or otherwise obtained) between the first rear pin 72 and the second rear pin 74 (i.e., the attachment distance between the pins 72, 74). $R_1$ is the calculated difference between $L_1$ and $LA_1$. $R_2$ is the calculated difference between $L_2$ and $LA_2$. R is the calculated sum of $R_1$ and $R_2$. All of the units for the calculation are in units of length, such as centimeters, inches, etc.

Relying on equation (1), if the result R of equation (1) is less than or equal to 0, the first link 62 is attached before the second link 64. Alternatively, if the result R is greater than 0, the second link 64 is attached before the first link 62.

As should be apparent from equation (1), it is possible that, in the rare instance where R=0, either the first link 62 or the second link 64 could be attached first. However, for various reasons, it is preferred for the first link 62 to be connected before the second link 64, as indicated above.

Returning to FIG. 7, since the first link 62 is being attached first, R≤0. This is consistent with the analysis of the results R, as indicated above.

Figure 8:
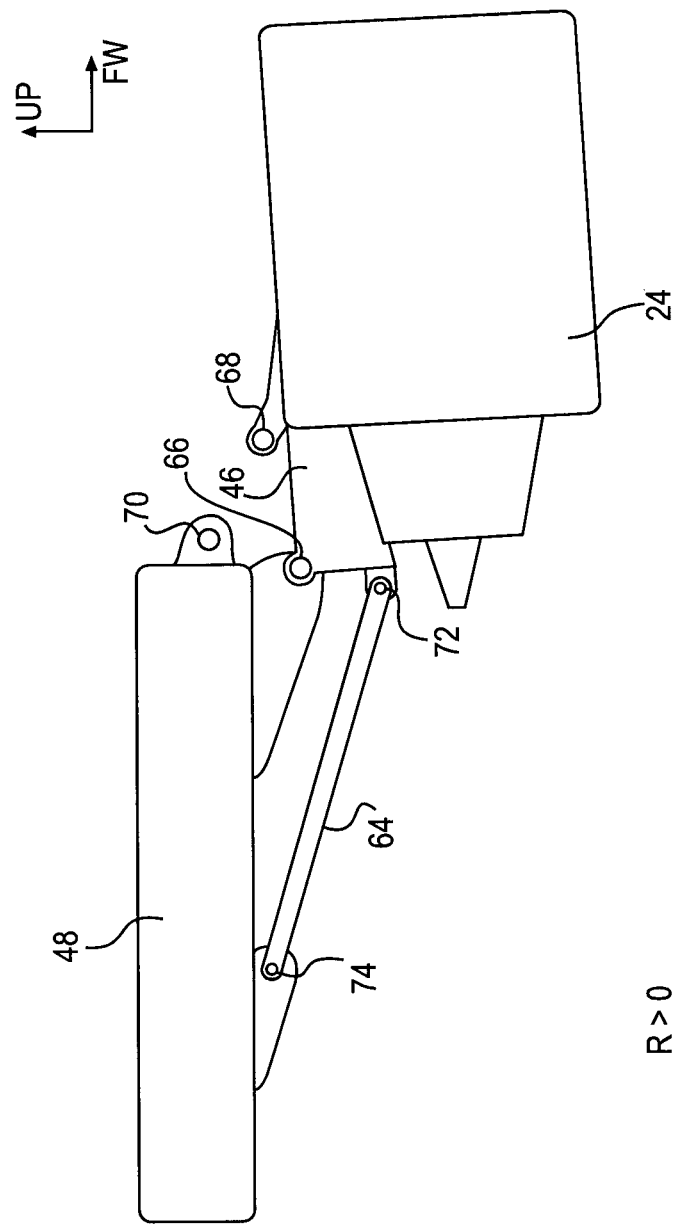
FIG. 8 is a graphical side view of the powerplant and pylon assembly illustrated in FIG. 2, after attachment of the second link but prior to the attachment of the first link between the pylon and the wing of the aircraft illustrated in FIG. 1.

FIG. 8 is a graphical side view of the powerplant 24 and pylon 46 assembly, and wing torque box 48. This illustration depicts the second link 64 being attached between the pylon 46 and the wing torque box 48 before attachment of the first link 62. In this illustration, R>0.

As indicated above, FIG. 3 is a graphical, side view of the powerplant 24 and pylon 46 assembly, and wing torque box 48 after both the first link 62 and the second link 64 have been attached between the pylon 46 and the wing torque box 48. As should be apparent from the foregoing, the present invention utilizes the weight of the powerplant 24 and pylon 46 assembly to assist with the attachment of the powerplant 24 and pylon 46 assembly to the wing torque box 48. In both cases, the downward rotation of the powerplant 24 and pylon 46 assembly due to gravity helps the powerplant 24 and pylon 46 assembly to be positioned for attachment to the wing torque box 48.

As should be apparent to those skilled in the art, during assembly, the powerplant 24 and pylon 46 assembly are supported on a lifting tool. In the instance where R and the first link 62 is attached first, the powerplant 24 and pylon 46 assembly is then suspended from the wing torque box 48 via the first link 62. In other words, the weight of the powerplant 24 and pylon 46 assembly may be used to introduce a tension load on the first link 62. In the instance where R>0 and the second link 64 is attached first, the powerplant 24 and pylon 46 assembly is lowered into position, placing the second link 64 into compression. Regardless of which link 62, 64 is attached first, the weight of the powerplant 24 and pylon 46 assembly is subsequently relied upon to assist with alignment of the holes that are associated with the other link.

Figure 9:
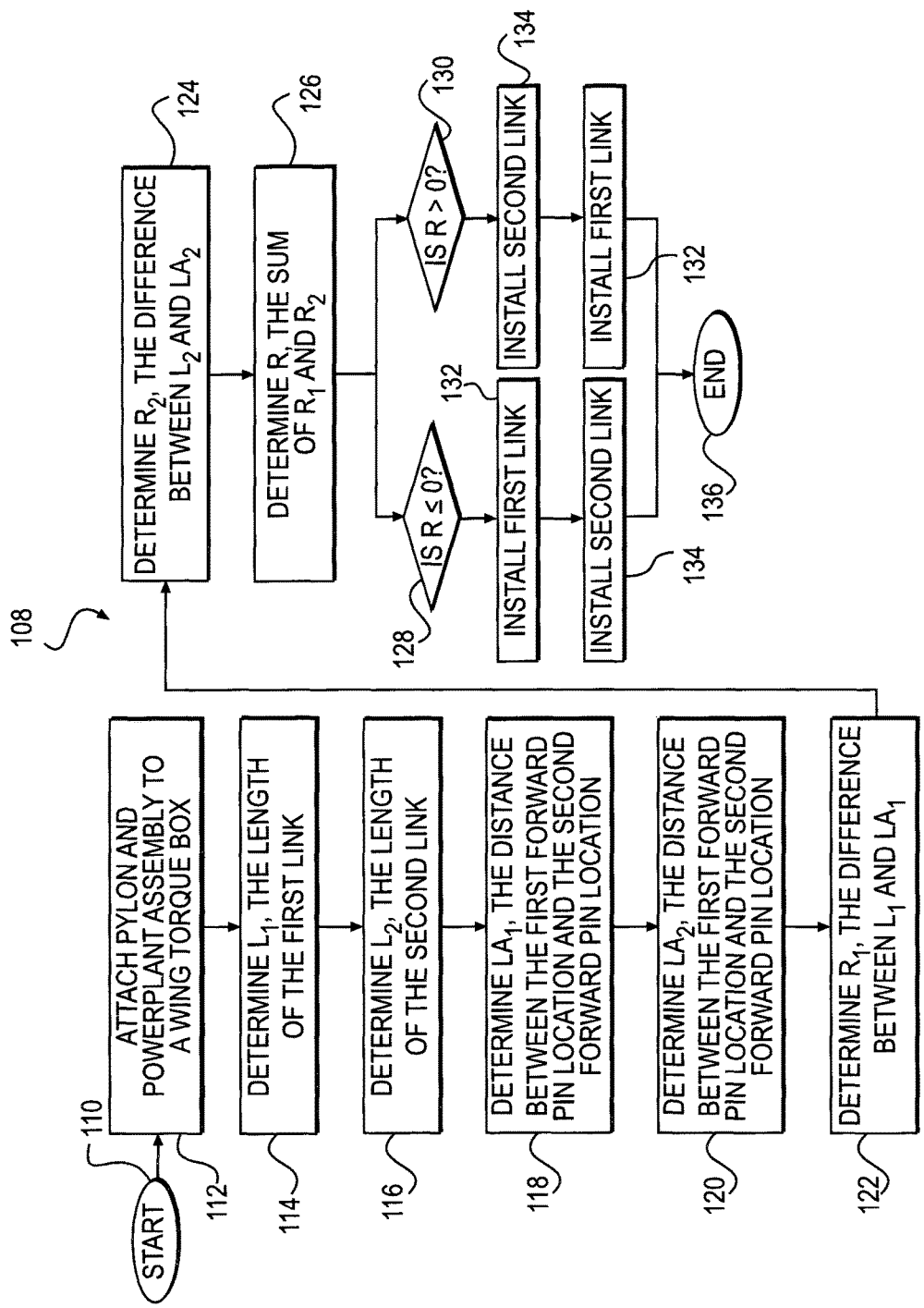
FIG. 9 is a graphical representation of a flow chart outlining one method of the present invention for attachment of the powerplant and pylon assembly illustrated in FIG. 2 to the wing of the aircraft illustrated in FIG. 1.

FIG. 9 is a graphical representation of the method 108 of the present invention.

The method 108 begins at step 110. As indicated above, the method 108 begins before the powerplant 24 and pylon 46 assembly have been connected to the wing torque box 48 at the primary attachment 76. The first step of the method 108, therefore, entails connecting the powerplant 24 and pylon 46 assembly to the wing torque box 48, as indicated by step 112. This connection entails connecting the powerplant 24 and pylon 46 assembly to the wing torque box 48 via the left primary pin 82 and the right primary pin 88, as indicated above.

As indicated above, the positioning of the powerplant 24 and pylon 46 assembly with respect to the locations of the left primary pin 82 and the right primary pin 88 may require adjustment of the angular pitch of the powerplant 24 and pylon 46 assembly with respect to the wing torque box 48. This angular adjustment of the powerplant 24 and pylon 46 assembly is not considered to be a part of the method of the present invention. As noted above, however, the left primary pin 82 and the right primary pin 84 are two of the four points establishing the hyperstatic connection of the powerplant 24 and pylon 46 assembly to the wing torque box 48 (i.e., A3 and A4). For clarity, the other two connection points are the locations for the first forward pin 68 (A1) and the second forward pin 72 (A2). In the alternative embodiment, where the first link 62 and the second link 64 are considered to be part of the powerplant 24 and pylon 46 assembly, the other two connection points are the locations of the first rear pin 70 (A1) and the second rear pin 74 (A2).

The method 108 proceeds from step 112 to step 114, where the method 108 determines the length 98 of the first link 62. This length 98 also is referred to as $L_1$. In one contemplated embodiment, the length 98 ($L_1$) may be measured (or calculated) automatically. In another embodiment, the length 98 ($L_1$) may be entered into a computer program as an input (either manually or automatically from, for example, a separate program or database). In this second embodiment, it is contemplated that the length 98 ($L_1$) may have been determined by another manufacturing step or may be provided by a manufacturer of the first link 62. In accordance with a non-limiting example, the length may be obtained via receipt of coordinates for each of the attachment holes at either end of the first link 62 in relation to a pre-determined reference system.

At step 116, the method 108 determines the length 100 of the second link 64. This length 100 also is referred to as $L_2$. In one contemplated embodiment, the length 100 ($L_2$) may be measured (or calculated) automatically. In another embodiment, the length 100 ($L_2$) may be entered into a computer program as an input (either manually or automatically from, for example, a separate program or database). In this second embodiment, it is contemplated that the length 100 ($L_2$) may have been determined by another manufacturing step or may be provided by a manufacturer of the second link 64. In accordance with a non-limiting example, the length 100 ($L_2$) may be obtained via receipt of coordinates for each of the attachment holes at either end of the second link 64 in relation to a pre-determined reference system.

With respect to steps 114 and 116, it is noted that these steps need not be performed in the order illustrated in FIG. 9. To the contrary, the steps 114, 116 may be performed in reverse order without departing from the scope of the present invention. In addition, it is contemplated that steps 114, 116 may be performed simultaneously.

From step 116, the method 108 proceeds to step 118, where the method 108 determines the distance 102 ($LA_1$) (measured, calculated or otherwise obtained) between the location of the first forward pin 68 and the location of the second forward pin 70. It is contemplated that the distance 102 ($LA_1$) will be measured or calculated via one or more techniques available to those skilled in the art. The distance 102 ($LA_1$) may be entered into a computer program as an input (either manually or automatically from, for example, a separate program or database). In accordance with a non-limiting example, the distance 102 ($LA_1$) may be determined via location coordinates provided for the hole for second forward pin 70 and for the hole for first forward pin 68. These coordinates may be originally provided with reference to two different reference systems. For example, the coordinates for the hole for the second forward pin 70 may be provided in relation to a first coordinate reference system on the wing torque box 48 and the coordinates of the hole for the first forward pin 68 may be provided in relation to a second coordinate reference system on the powerplant 24 and pylon 46 assembly. Once the third and fourth attachment points A3, A4 have been connected, the coordinates for the hole for the second forward pin 70 and for the first forward pin 68 may be merged into a common reference system such that the distance 102 ($LA_1$) can be calculated.

From step 118, the method 108 proceeds to step 120, where the method 108 determines the distance 104 ($LA_2$) (measured, calculated or otherwise obtained) between the location of the first rear pin 72 and the location of the second rear pin 74. It is contemplated that the distance 104 ($LA_2$) will be measured or calculated via one or more techniques available to those skilled in the art. The distance 104 ($LA_2$) may be provided to a computer program automatically or entered manually, as required or as desired. In accordance with a non-limiting example, the distance 104 ($LA_2$) may be determined via location coordinates provided for the hole for second rear pin 74 and for the hole for first rear pin 72. These coordinates may be originally provided with reference to two different reference systems. For example, the coordinates for the hole for the second rear pin 74 may be provided in relation to a first coordinate reference system on the wing torque box 48 and the coordinates of the hole for the first rear pin 72 may be provided in relation to a second coordinate reference system on the powerplant 24 and pylon 46 assembly. Once the third and fourth attachment points A3, A4 have been connected, the coordinates for the hole for the second rear pin 74 and for the first rear pin 72 may be merged into a common reference system such that the distance 104 ($LA_2$) can be calculated.

As with the steps 114, 116, the steps 118, 120 need not be performed in the order depicted in FIG. 9. To the contrary, step 120 may be performed prior to step 118 without departing from the scope of the present invention. In still another contemplated embodiment, the distances 102 ($LA_1$) and 104 ($LA_2$) may be determined simultaneously. Likewise, steps 118 and 120 need not be performed following steps 114, 116 and may be performed prior to steps 114, 116 or simultaneously therewith.

From step 120, the method 108 proceeds to step 122 where the first result value $R_1$ is determined. The first result value $R_1$ is the calculated difference between $L_1$ and $LA_1$. As noted in equation (1), $R_1=L_1-LA_1$.

From step 122, the method 108 proceeds to step 124 where the second result value $R_2$ is determined. The second result value $R_2$ is the calculated difference between $L_2$ and $LA_2$. As noted in equation (1), $R_2=L_2-LA_2$.

As should be apparent, the steps 122 and 124 need not be performed in the order outlined in FIG. 9. It is contemplated that step 124 may be performed before step 122 without departing from the scope of the present invention. In still another contemplated embodiment, steps 122 and 124 may be performed simultaneously (i.e., parallel computation).

The method 108 proceeds from step 124 to step 126. At step 126, the method determines the result R by summing $R_1$ and $R_2$. As indicated by equation (1), $R=R_1+R_2$. Once the value of R is determined, the method 108 may proceed to step 128 or step 130, which are parts of parallel operations.

At step 128, the method 108 determines if the result R is ≤0. If R≤0, the method proceeds to step 132, wherein the first link 62 is installed. After the first link 62 is installed, the method 108 may proceed to step 134 where the second link 64 is installed.

If the method 108 determines that R>0 at step 130, the method 108 proceeds to step 134 where the second link 64 is installed. After installation of the second link 64, the method 108 proceeds to step 132 where the first link 62 is installed.

From either step 132 or step 134, the method 108 proceeds to step 136 where the method 108 ends.

With respect to steps 128 and 130, it is noted that these steps may be performed in any order or simultaneously without departing from the scope of the present invention. With regard to the installation steps 132, 134, the order of the performance of these steps will be determined based on the result R. As noted, if the result R is the first link 62 is installed before the second link 64. If R>0, the second link 64 is installed before the first link 62.

In the context of the construction discussed above, the present invention encompasses a method of attachment of a combined (or pre-assembled) powerplant 24 and pylon 46 assembly, including the PQuad PQ, to an aircraft 10. More specifically, the method concerns the attachment of a pre-assembled powerplant 24 and pylon 46 assembly or PQuad PQ to the wing 18, 20 of an aircraft 10. As noted above, however, the pylon 46 is not required to practice the present invention.

Without limiting the present invention, therefore, the method 108 for installing a powerplant 24, a powerplant 24 and pylon 46 assembly, or a PQuad PQ on an aircraft 10 comprises determining a first length 98 ($L_1$) of a first link 62 with a first end and a second end, the first link 62 being positionable between the powerplant 24, the powerplant 24 and pylon 46 assembly, or the PQuad PQ and the aircraft 10 (step 114). With respect to the method 108, the present invention is discussed in connection with, but not limited to, the powerplant 24 and pylon 46 assembly.

The method 108 proceeds to determine a second length 100 ($L_2$) of a second link 64 with a third end and a fourth end, the second link 64 being positionable between the powerplant 24 and pylon 46 assembly and the aircraft 10 (step 116).

At step 118, the method 108 then determines a first distance 102 ($LA_1$) between a first position 68 (A1) on the powerplant 24 and pylon 46 assembly and a second position 70 (A1) on the aircraft 10, wherein the first position 68 (A1) and the first end are in register when the first link 62 connects the powerplant 24 and pylon 46 assembly to the aircraft 10 and the second position 70 (A1) and the second end are in register when the first link 62 connects the powerplant 24 and pylon 46 assembly to the aircraft 10.

At step 120, the method determines a second distance 104 ($LA_2$) between a third position 72 (A2) on the powerplant 24 and pylon 46 assembly and a fourth position 74 (A2) on the aircraft 10, wherein the third position 72 (A2) and the third end are in register when the second link 64 connects the powerplant 24 and pylon 46 assembly to the aircraft 10 and the fourth position 74 (A2) and the fourth end are in register when the second link 64 connects the powerplant 24 and pylon 46 assembly to the aircraft 10.

At step 122, the method 108 determines a first result $R_1$ by subtracting the first distance 102 ($LA_1$) from the first length 98 ($L_1$).

At step 124, the method 108 determines a second result $R_2$ by subtracting the second distance 104 ($LA_2$) from the second length 100 ($L_2$).

The method 108 then proceeds to step 126, where the method 108 determines a result R by adding the first result $R_1$ and the second result $R_2$.

At step 128, the method 108 evaluates if the result R is less than or equal to zero. At step 130, the method 108 evaluates if the result R is greater than zero. If the result R is less than or equal to zero, the first link 62 is installed between the powerplant 24 and pylon 46 assembly and the aircraft 10 (step 132) before the second link 64 is installed (step 134). If the result R is greater than zero, the second link 64 is installed before the first link 62.

In an alternative embodiment, the method 108 contemplates that the pylon 46 is excluded from the engine 24, as discussed above. In a further contemplated embodiment, the method 108 involves the PQuad PQ.

Those skilled in the art should appreciate that all or part of the functionality previously described herein with respect to the method 108 of determining an order of attachment of links between a pre-assembled powerplant and pylon assembly and an aircraft may be implemented as pre-programmed hardware or firmware elements (e.g., application specific integrated circuits ("ASICs"), electrically erasable programmable read-only memories ("EEPROMs"), etc.), or other related components.

In other embodiments of the invention, all or part of the functionality previously described herein may be implemented as software consisting of a series of instructions for execution by a computing unit. As should be apparent, the software may be executed on a suitable computing unit, such as a computer, tablet, smartphone, or other electronic device. The series of instructions may be stored on a medium which is fixed, tangible and readable directly by the computing unit (e.g., USB key, flash memory, CD-ROM, ROM, PROM, EPROM or fixed disk), or the instructions may be stored remotely but be transmittable to the computing unit via a modem or other interface device (e.g., a communications adapter) connected to a network over a transmission medium. The transmission medium may be either a tangible medium (e.g., optical, digital or analog communications lines) or a medium implemented using wireless techniques (e.g., microwave, infrared or other transmission schemes).

Figure 10:
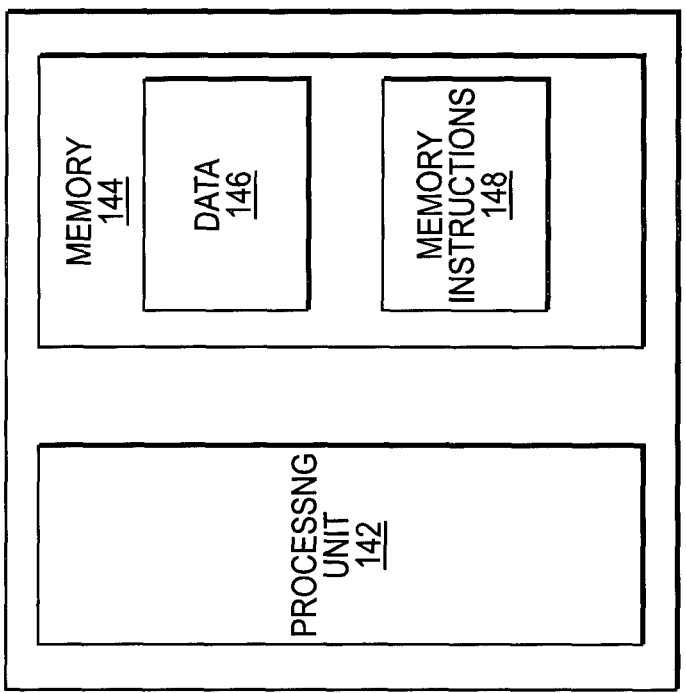
FIG. 10 is a graphical representation of a system for executing instructions consistent with the method of the present invention.

The computing unit implementing the functionality of determining an order of attachment of links between a pre-assembled powerplant 24 and pylon 46 assembly and an aircraft 10 may be configured as a computing unit 140 of the type depicted in FIG. 10, including a processing unit 142 and a memory 144 connected by a communication bus 150. The memory includes, among other things, data 146 and program instructions 148. The processing unit 142 is adapted to process the data 146 and the program instructions 148 in order to implement the functionality described herein. In a non-limiting implementation, the program instructions 148 implement the functionality of processing unit 142 described above. The computing unit 140 may also comprise a number of interfaces for receiving or sending data elements to external devices. For example, an interface may be used for receiving data streams indicative of coordinates of attachment points on both the aircraft 10 and the pre-assembled powerplant 24 and pylon 46 assembly. Likewise, the computing unit 140 may comprise an interface for releasing a signal causing a display unit to display of the results of the determination arrived at by the processing unit 142. An interface for receiving signals from a user via a keyboard, mouse, stylus, touch screen or any other input device also may be present.

Those skilled in the art should further appreciate that the program instructions 148 may be written in a number of programming languages for use with many computer architectures or operating systems.

It will be appreciated that the system for determining an order of attachment of links between a pre-assembled powerplant 24 and pylon 46 assembly and an aircraft 10, may be of a distributed nature where the data or coordinates regarding positioning data of the attachment points on the aircraft 10 and pre-assembled powerplant 24 and pylon 46 assembly may be collected at one location and transmitted to the computing unit 140 over a network. The network may be any suitable network including but not limited to a global public network such as the Intranet, a private network and a wireless network. In addition, the computing unit implementing the functionality and method described above may be adapted to process coordinates originating from multiple aircraft and pre-assembled pylon and engine information, using suitable methods known in the computer related arts.

While the implementation described above contemplates execution electronically, the method 108 is not limited thereto.

As noted above, the embodiment(s) described herein are intended to be exemplary of the wide breadth of the present invention. Variations and equivalents of the described embodiment(s) are intended to be encompassed by the present invention, as if described herein.

What is claimed is:

1. A method for installing a pre-assembled combined powerplant and pylon assembly to an aircraft, comprising:
   providing the pre-assembled combined power plant and pylon assembly; obtaining a first length of a first link attachable between a first attachment point on the pre-assembled combined powerplant and pylon assembly and a second attachment point on the aircraft;
   obtaining a second length of a second link attachable between a third attachment point on the pre-assembled combined powerplant and pylon assembly and a fourth attachment point on the aircraft;
   obtaining a first distance between the first attachment point on the pre-assembled combined powerplant and pylon assembly and the second attachment point on the aircraft;
   obtaining a second distance between the third attachment point on the pre-assembled combined powerplant and pylon assembly and the fourth attachment point on the aircraft;
   determining a first result by subtracting the first distance from the first length;
   determining a second result by subtracting the second distance from the second length;
   determining a third result by adding the first result and the second result;
   if the third result is less than or equal to zero, installing the first link between the first attachment point and the second attachment point and then installing the second link between the third attachment point and the fourth attachment point; and
   if the third result is greater than zero, installing the second link between the third attachment point and the fourth attachment point and then installing the first link between the first attachment point and the second attachment point.

2. The method of claim 1, further comprising: connecting the pylon to the aircraft at a primary attachment point before installing either the first link or the second link.

3. The method of claim 2, further comprising:
   connecting a first end of the first link to the first attachment point before connecting a second end of the first link to the second attachment point; and
   connecting a third end of the second link to the third attachment point before connecting a fourth end of the second link to the fourth attachment point.

4. The method of claim 2, further comprising:
   connecting a second end of the first link to the second attachment point before connecting a first end of the first link to the first attachment point; and
   connecting a fourth end of the second link to the fourth attachment point before connecting a third end of the second link to the third attachment point.

5. The method of claim 2, further comprising:
   connecting a first end of the first link to the first attachment point before connecting a second end of the first link to the second attachment point; and
   connecting a fourth end of the second link to the fourth attachment point before connecting a third end of the second link to the third attachment point.

6. The method of claim 2, further comprising:
   connecting a second end of the first link to the second attachment point before connecting a first end of the first link to the first attachment point; and
   connecting a third end of the second link to the third attachment point before connecting a fourth end of the second link to the fourth attachment point.

7. The method of claim 2, wherein:
   the primary attachment point, the first attachment point and the third attachment point are positioned longitudinally with respect to the aircraft; and
   the primary attachment point is interposed between the first attachment point and the third attachment point.

8. The method of claim 2, wherein: the primary attachment point comprises fifth and sixth attachment points aligned laterally with respect to the aircraft.

9. The method of claim 2, wherein:
the primary attachment point comprises fifth and sixth attachment points, the first and the third attachment points are aligned longitudinally with respect to the aircraft, the fifth and sixth attachment points are aligned laterally with respect to the aircraft, and
the primary attachment point is interposed between the first attachment point and the third attachment point.

10. The method of claim 1, wherein the pre-assembled combined powerplant and pylon assembly comprises at least one selected from the group comprising a left fan cowl, a left thrust reverser, a right fan cowl, a right thrust reverser, and an inlet cowl.

11. A method for installing a pre-assembled combined powerplant and pylon assembly to a wing torque box of an aircraft, comprising:
providing the pre-assembled combined power plant and pylon assembly; obtaining a first length of a first link attachable between a first attachment point on the pre-assembled combined powerplant and pylon assembly and a second attachment point on the wing torque box;
obtaining a second length of a second link attachable between a third attachment point on the pre-assembled combined powerplant and pylon assembly and a fourth attachment point on the wing torque box;
obtaining a first distance between the first attachment point on the pre-assembled combined powerplant and pylon assembly and the second attachment point on the wing torque box;
obtaining a second distance between the third attachment point on the pre-assembled combined powerplant and pylon assembly and the fourth attachment point on the wing torque box;
determining a first result by subtracting the first distance from the first length;
determining a second result by subtracting the second distance from the second length;
determining a third result by adding the first result and the second result;
if the third result is less than or equal to zero, installing the first link between the first attachment point and the second attachment point and then installing the second link between the third attachment point and the fourth attachment point; and
if the third result is greater than zero, installing the second link between the third attachment point and the fourth attachment point and then installing the first link between the first attachment point and the second attachment point.

* * * * *